(12) United States Patent
Herr et al.

(10) Patent No.: US 8,921,443 B2
(45) Date of Patent: Dec. 30, 2014

(54) RADIATION CURABLE TEMPORARY LAMINATING ADHESIVE FOR USE IN HIGH TEMPERATURE APPLICATIONS

(75) Inventors: Donald E. Herr, Lancaster, PA (US); Shengqian Kong, Hillsborough, NJ (US); Sharon Chaplinsky, Ringoes, NJ (US); Allison Yue Xiao, Belle Mead, NJ (US)

(73) Assignee: Henkel IP & Holding GmbH, Duesseldorf (DE)

( * ) Notice: Subject to any disclaimer, the term of this patent is extended or adjusted under 35 U.S.C. 154(b) by 14 days.

(21) Appl. No.: 13/618,203

(22) Filed: Sep. 14, 2012

(65) Prior Publication Data

US 2014/0011904 A1    Jan. 9, 2014

Related U.S. Application Data

(63) Continuation of application No. PCT/US2011/045712, filed on Jul. 28, 2011.

(60) Provisional application No. 61/374,794, filed on Aug. 18, 2010.

(51) Int. Cl.

| | |
|---|---|
| *C08F 2/50* | (2006.01) |
| *C08F 2/46* | (2006.01) |
| *B29C 71/04* | (2006.01) |
| *A61L 2/08* | (2006.01) |
| *A61L 24/00* | (2006.01) |
| *C08G 61/04* | (2006.01) |
| *C09J 133/04* | (2006.01) |
| *C09J 4/06* | (2006.01) |
| *C09J 115/00* | (2006.01) |
| *C09J 147/00* | (2006.01) |

(52) U.S. Cl.
CPC .............. *C09J 147/00* (2013.01); *C09J 133/04* (2013.01); *C09J 4/06* (2013.01); *C09J 115/00* (2013.01); *C08L 2312/06* (2013.01)
USPC ........ 522/64; 522/6; 522/1; 522/71; 522/189; 522/184; 520/1

(58) Field of Classification Search
CPC ............ C08F 2/50; C08F 2/48; C08F 220/18; C08F 24/8485; C08L 33/08
USPC ................... 522/64, 6, 1, 71, 189, 184; 520/1
See application file for complete search history.

(56) References Cited

U.S. PATENT DOCUMENTS

| | | | |
|---|---|---|---|
| 4,786,586 A | 11/1988 | Lee et al. | |
| 5,128,388 A | 7/1992 | Komori et al. | |
| 5,883,148 A | 3/1999 | Lewandowski et al. | |
| 5,936,934 A | 8/1999 | Kuribayashi et al. | |
| 6,410,611 B1 | 6/2002 | Sakurai et al. | |
| 7,547,735 B1 | 6/2009 | Konarski et al. | |
| 7,569,641 B2 | 8/2009 | Fan et al. | |
| 2006/0292378 A1* | 12/2006 | Mgaya et al. ............... | 428/423.1 |
| 2007/0179254 A1 | 8/2007 | Wang et al. | |
| 2008/0176078 A1 | 7/2008 | Tanaka | |
| 2009/0026934 A1 | 1/2009 | Fujita et al. | |
| 2009/0030107 A1 | 1/2009 | Watanabe et al. | |
| 2009/0036626 A1 | 2/2009 | Tanaka | |
| 2009/0104448 A1* | 4/2009 | Thompson et al. ........... | 428/413 |
| 2009/0324961 A1 | 12/2009 | Lu et al. | |
| 2010/0059113 A1 | 3/2010 | Hasegawa et al. | |

FOREIGN PATENT DOCUMENTS

| | | |
|---|---|---|
| CN | 101392152 A | 3/2009 |
| EP | 0153520 A1 | 9/1985 |
| EP | 1666504 A1 | 6/2006 |
| EP | 2088179 A1 | 8/2009 |
| EP | 2088180 A1 | 8/2009 |
| GB | 2257153 A | 1/1993 |
| JP | 280413 A | 3/1990 |
| JP | 291111 A | 3/1990 |
| JP | 4202581 A | 7/1992 |
| JP | 6065334 A | 3/1994 |
| JP | 6198829 A | 7/1994 |
| JP | 2002069138 A | 3/2002 |
| JP | 2006008819 A | 1/2006 |
| JP | 2006282911 A | 10/2006 |
| JP | 2007077321 A | 3/2007 |
| JP | 2007137166 A | 6/2007 |
| JP | 2008303362 A | 12/2008 |
| JP | 2009299037 A | 12/2009 |
| WO | 2005042253 A1 | 5/2005 |
| WO | 2005068506 A1 | 7/2005 |
| WO | 2006001522 A1 | 1/2006 |
| WO | 2009086095 A2 | 7/2009 |
| WO | 2010051106 A2 | 5/2010 |

\* cited by examiner

*Primary Examiner* — Ling Choi
*Assistant Examiner* — Jessica E Whiteley
(74) *Attorney, Agent, or Firm* — James J. Cummings

(57) ABSTRACT

A radiation curable temporary laminating adhesive composition for use in temperature applications at 150° C. or greater, and typically at 200° C. or greater, comprises (A) a hydrogenated polybutadiene diacrylate; (B) a radical photoinitiator; and (C) a diluent.

12 Claims, 1 Drawing Sheet

1 Rigid carrier
2 Temporary laminating adhesive
3 Plastic film

RADIATION CURABLE TEMPORARY LAMINATING ADHESIVE FOR USE IN HIGH TEMPERATURE APPLICATIONS

CROSS-REFERENCE TO RELATED APPLICATIONS

This application is a continuation of International Patent Application No. PCT/US2011/045712 filed Jul. 28, 2011, which claims the benefit of U.S. Provisional Patent Application No. 61/374,794 filed Aug. 18, 2010, the contents of both of which are incorporated herein by reference.

This Invention was made with support from the Government of the United States of America under Contract No. RFP05-115 awarded by the Army Research Laboratories. The Government has certain rights in the Invention.

FIELD OF THE INVENTION

This invention relates to radiation curable temporary laminating adhesive for use in high temperature applications, and in particular in the attachment of flexible substrates to rigid substrates.

BACKGROUND

Advances in the development of thin-film transistors (TFT) have facilitated the commercialization of active matrix liquid crystal displays enabling notebook PCs, and flat screen TVs and monitors. In parallel with flat rigid glass substrates based on TFT technology, there is also a growing interest in flexible TFT backplanes for both large and small area electronics, such as for display, imaging, sensor, photovoltaic and RFID applications.

Thin plastic substrates are the primary candidates for flexible substrates. Polyester films such as polyethylene terephthalate (PET) and polyethylene naphthalate (PEN) from DuPont Teijin Film (DTF) are well-known substrates for a wide range of electronic applications. PEN-based substrates offer excellent dimensional stability, low moisture pickup, good solvent resistance, high clarity, and very good surface smoothness. Most flexible substrates (for example, those made of polyethylene naphthalates or polyimides), however, are too thin to be handled freestanding in standard microelectronic or semiconductor machines and tools. This creates a need for a means to permit temporary bonding of the flexible substrate to a rigid carrier as the flexible substrate is moved through the tools, machines, ovens, and cleaning devices used in fabrication processes.

Laminating adhesives that permit temporary bonding of flexible substrates and that will not compromise handling or performance of the substrates would facilitate the rapidly growing demand for flexible electronics. Development of such adhesives would allow existing fabrication methods, such as for semiconductors, active matrix thin film transistors, or photovoltaics, to use the currently installed base of manufacturing tools and machines.

Such laminating adhesives used in electronics fabrication processes must maintain adhesion at temperatures equal to or greater than 200° C. and at vacuum conditions of $10^{-6}$ mmHg for several hours without deformation or defects. In one embodiment, the adhesives must maintain adhesion at temperatures equal to or greater than 150° C. Most currently available laminating adhesives are not thermally stable and cannot survive the maximum processing temperatures of the manufacturing steps. To address these issues, the inventors have found certain resin combinations suitable for high temperature temporary bonding applications.

SUMMARY OF THE INVENTION

This invention is a radiation curable temporary laminating adhesive composition for use in temperature applications at 150° C. or greater, and typically at 200° C. or greater. The laminating adhesive comprises (A) a liquid hydrogenated polybutadiene acrylate or methacrylate; (B) a radical photoinitiator; and (C) a diluent.

DETAILED DESCRIPTION OF THE INVENTION

Figure 1:
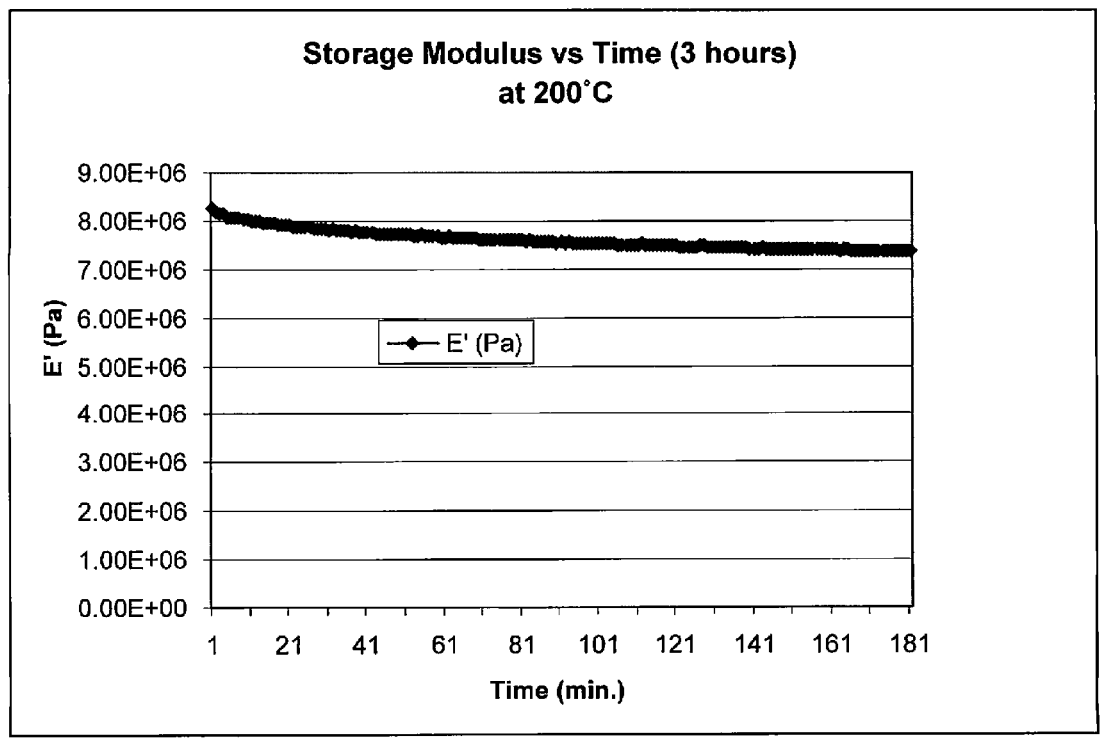
FIG. 1 is a storage modulus versus time plot of a cured adhesive (1.25 mm thick, Example 5) analyzed at 200° C. for three hours using a RSA III Dynamic Analyzer (TA Instruments)
Figure 2:
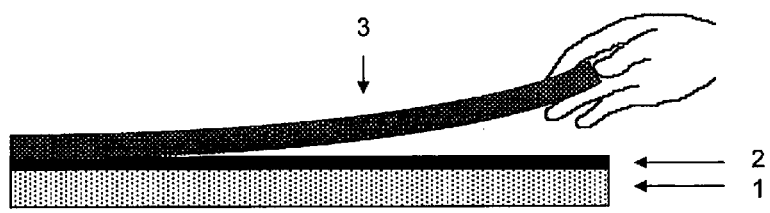
FIG. 2 shows clean peel of adhesive off a plastic film, the adhesive remaining on the rigid carrier.

Within this specification and the claims, the term "acrylate" encompasses both acrylates and methacrylates; the term radiation means actinic electromagnetic radiation capable of inducing a chemical change in a material and being most useful with wavelengths in the ultraviolet (UV) and/or visible regions of the spectrum, and electron beam radiation.

The liquid hydrogenated polybutadiene acrylate will have a number average molecular weight of about 500 to about 10000. In one embodiment the number average molecular weight is from 1000 to 5000. The acrylate will have no urethane linkage in its structure, and in one embodiment will have one to three acrylates per molecule. Liquid hydrogenated polybutadiene acrylates are commercially available, for example, from Sartomer.

The radical photoinitiator is one capable of initiating polymerization at a wavelength above 300 nm and is selected from the group consisting of alpha-aminoketones and mono-acylphosphine oxides. The selection of a photoinitiator for the inventive radiation curable materials is familiar to those skilled in the art of radiation curing. Exemplary radical photoinitiators are disclosed in Radiation Curing: Science and Technology, 1992, Plenum Press; N.Y.; S. P. Pappas, Ed. and Encyclopedia of Polymer Science and Engineering, 11, 187, 1988, John Wiley and Sons, N.Y.; H. F. Mark, N. M. Bikales, C. G. Overberger, G. Menges, Eds. A suitable photoinitiator is one that exhibits a light absorption spectrum that is distinct from that of the resins, fillers, and other additives in the radiation curable system. If the laminating adhesive must be cured through a cover or substrate, the photoinitiator will be one capable of absorbing radiation at wavelengths for which the cover or substrate is transparent. For example, if a laminating adhesive is to be cured through a PEN film, the photoinitiator must have significant UV absorbance above about 300 nm.

Suitable photoinitiators include, but are not limited to, alpha-aminoketones, such as, Irgacure 369, Irgacure 907, Irgacure 1300 from Ciba Specialty Chemicals; R-Gen 998 and Chivacure 169 from Chitec; Omnipol 910 and Omnipol SZ from IGM Resins; and mono-acylphosphine oxides, such as, Darocur TPO, Darocur 4265, Irgacure 2022, and lrgacure 2100 from Ciba Specialty Chemicals; and Chivacure 1256 from Chitec. The selection of an efficient radical photoinitiating agent is known to those skilled in the art of radical UV curing.

The diluent can be either a reactive or a non-reactive diluent. Non-reactive diluents are typically referred to as solvents. In one embodiment, reactive diluents are selected from the group consisting of monofunctional low polarity acrylates having 6-14 carbons in a linear or branched alkyl chain. Exemplary monomers are hexyl (meth)acrylate, octyl (meth)acrylate, isooctyl (meth)acrylate, decyl (meth)acrylate, isodecyl (meth)acrylate, dodecyl (meth)acrylate, tetradecyl (meth)acrylate. Non-reactive diluents are selected from the group consisting of non-polar linear or branched alkane solvents having boiling points within the range 95° to 200° C. In one embodiment, the boiling point range is 95° to 155° C. Exemplary non-reactive diluents or solvents are heptane, octane and its isomers, and nonane and its isomers. Various additives may be included in the laminating adhesive formulation for desired performance. These include, but are not limited to, silane adhesion promoters, antioxidants, rheology modifiers, fillers (including nanofillers). In particular, the use of adhesion promoters may allow a change in the failure mode of the adhesive, from failure at the interface of the adhesive and the rigid substrate, to failure at the interface of the adhesive and the flexible substrate.

These temporary bonding adhesives find utility in bonding flexible substrates to a rigid carrier during the fabrication processes for the flexible substrate. After fabrication, the flexible substrates must be released from their rigid carriers. Release is typically done by triggering adhesive failure at the interface of the adhesive with the flexible substrate.

EXAMPLES

Example 1

Solvent Based Radiation Curable Temporary Laminating Adhesive

This example discloses the synthesis of a temporary laminating adhesive and a test of its failure from a rigid substrate.

Hydrogenated polybutadiene acrylate, 133.6 grams, (Sartomer NTX 10333), mono-acylphosphine oxide photoinitiator, 1.35 grams, (Darocur TPO, Ciba Specialty Chemicals) were weighed into a flask, and warmed to 60° C. to dissolve. Next, octane, boiling point 126° C., 20 grams, was added to the above mixture solution (~87% solids), mixed well and filtered. A small sample was spin coated on silicon wafers and dried. A PEN film (Teones Q65, from DTF) was laminated onto the wafer and the laminated composite cured well under 3J UVA and then subjected to aging at 200° C. for three hours. The PEN film was then peeled off the wafer and the adhesive failure noted. The adhesive failed cleanly at the interface of the PEN and adhesive layer in both cases, that is, it remained on the rigid wafer and left no adhesive residue on PEN.

A similar study was conducted using Irgacure 651 (Ciba), an alpha-methoxy ketone, as the photoinitiator. Unlike the mono-acylphosphine oxide initiator, this initiator did not have sufficient absorption in the UVA range and thus resulted in poor through-cure.

Another study was conducted with Irgacure 819, a bis-acylphosphine oxide, as the photoinitiator. This initiator was not sufficiently soluble in the adhesive composition.

Example 2

Comparison of Various Solvents

Laminating adhesive formulations were prepared to contain (A) hydrogenated polybutadiene diacrylate with molecular weight around 2,000, 100 parts by weight (pbw), (CN 308, Sartomer), and (B) a mono-acylphosphine oxide, 1.24 parts by weight (Irgacure, 2100, Ciba), and (C) independently various diluents at 25 parts by weight. The diluents are disclosed in Table 1. The formulations were spin coated on 5.08 cm×7.62 cm (2 in×3 in) glass slides, and dried for ten minutes at room temperature, 30 minutes at 80° C., and 15 minutes at 130° C. The glass slides and PEN flexible substrate were laminated at 100° C. and 137895 N/m2 (20 psi). Samples were exposed to 1J UVA through the PEN and subjected to additional aging at 200° C. for three hours. The PEN substrate was then peeled off and the film quality of the adhesive and adhesive failure (AF) mode were recorded. All samples showed adhesive failure from the PEN, that is, the adhesive peeled off the PEN and remained on the rigid carrier. The use of higher boiling point (b.p.) solvents such as decane and dodecane resulted in blisters in the aged samples, while the lower boiling point nonane did not cause blisters. Results are reported in Table 1.

TABLE 1

| Compositions | 1 | 2 | 3 |
|---|---|---|---|
| Non-polar Solvent 10 pbw | Nonane (b.p. 151° C.) | Decane (b.p. 174° C.) | Dodecane (b.p. 216° C.) |
| Film quality after cure | smooth, no voids | smooth, no voids | smooth, no voids |
| Failure mode after cure and peel | adhesive failure at interface with PEN | adhesive failure at interface with PEN | adhesive failure at interface with PEN |
| Film quality after heat aging | good, no bubbles or voids | one blister | one blister |
| Failure mode after heat aging and peel | adhesive failure at interface with PEN | adhesive failure at interface with PEN | adhesive failure at interface with PEN |

Example 3

Comparative Examples with Various Polybutadiene Backbones

Laminating adhesive formulations were prepared to contain independently 40 parts by weight of various polybutadiene diacrylates as disclosed in Table 2, 10 parts by weight of isodecyl acrylate (SR395, Sartomer) as a diluent, and 0.5 parts by weight of a mono-acylphosphine photoinitiator (Irgacure 2100, Ciba). Composition 4 contained a non-hydrogenated polybutadiene dimethacrylate (CN301, Sartomer); Composition 5 contained a non-hydrogenated polybutadiene diacrylate (CN307, Sartomer); Composition 6 contained a hydrogenated polybutadiene urethane acrylate (urethane linkages) (CN 9014,Sartomer); and Composition 7 contained a hydrogenated polybutadiene urethane methacrylate (urethane linkages) made from hydrogenated polybutadiene with hydroxyl end-groups (MW 2,000) (Krasol HLBH-P2000, Cray Valley) and 2-methacryloyloxyethyl isocyanate (Karenz MOI, Showa Denko) via a hydroxyl-isocyanate addition.

The formulations were spin coated on 5.08 cm×7.62cm (2 in×3 in) glass slides. The glass slides and PEN flexible substrate were laminated at 100° C. and 137895 N/m2 (20 psi). Samples were exposed to 1J UVA through the PEN and subjected to additional aging at 200° C. for three hours. The PEN substrate was then peeled off and the film quality of the adhesive and adhesive failure (AF) mode were recorded.

The use of non-hydrogenated polybutadiene dimethacrylate (Composition 4) and non-hydrogenated polybutadiene diacrylate (Composition 5) resulted in significantly increased adhesion after aging, making the PEN very difficult to peel off the rigid glass substrate. Hydrogenated polybutadiene acrylate with urethane linkages (Composition 6) showed significant adhesion increase after aging. Hydrogenated polybutadiene urethane methacrylate (Composition 7) gave higher adhesion and an undesirable failure mode (adhesion failure from glass, instead of adhesion failure from PEN) after aging. None of these samples have the desired properties of Example 1, which shows adhesive failure at the interface with, and no residual on, the PEN flexible substrate. The results are reported in Table 2.

TABLE 2

|  | Composition 4 | Composition 5 | Composition 6 | Composition 7 |
|---|---|---|---|---|
| Film quality after cure | good | good | good | good |
| Failure mode after cure and peel | adhesion failure at interface with glass | adhesion failure at interface with either PEN or glass, residual on both | adhesion failure at interface with either PEN or glass, residual on both | adhesion failure at interface with PEN |
| Film quality after heat aging | good | good | good | good |
| Failure mode after heat aging and peel | adhesion failure at interface with glass, very difficult to peel off | adhesion failure at interface with either PEN or glass, residual on | adhesion failure at interface with glass, very difficult to peel off | adhesion failure at interface with glass, adhesion increased |

TABLE 2-continued

|  | Composition 4 | Composition 5 | Composition 6 | Composition 7 |
|---|---|---|---|---|
|  |  | both, PEN ripped before adhesive failure |  |  |

Example 4

Comparison of Various Mono-functional Acrylic Diluents

Laminating adhesive compositions were prepared to contain 72 parts by weight of an hydrogenated polybutadiene diacrylate (CN 308, Sartomer), 18 parts by weight independently of various mono-functional low polarity acrylic diluents shown in Table 3, and 0.9 parts by weight of a mono-acylphosphine photoinitiator (Irgacure, 2100).

The formulations were spin coated on 5.08 cm×7.62 cm (2 in×3 in) glass slides. The glass slides and PEN flexible substrate were laminated at 100° C. and 137895 N/m2 (20 psi). Samples were exposed to 1J UVA through the PEN and subjected to additional aging at 200° C. for three hours. The PEN substrate was then peeled off and the film quality of the adhesive and adhesive failure (AF) mode were recorded.

With the exception of the diluents hexadecyl acrylate, isobornyl acrylate, and octadecyl acrylate, all the reactive diluents worked very well. Results are reported in Table 3.

TABLE 3

|  | FILM QUALITY AFTER CURE | FAILURE MODE AFTER CURE AND PEEL | FILM QUALITY AFTER HEAT AGING | FAILURE MODE AFTER HEAT AGING AND PEEL |
|---|---|---|---|---|
| Composition 8 hexyl acrylate | good | clean adhesive failure at interface with PEN | good | clean adhesive failure at interface with PEN |
| Composition 9 2-ethylhexyl acrylate | good | clean adhesive failure at interface with PEN | good | clean adhesive failure at interface with PEN |
| Composition 10 octyl and decyl acrylate | good | clean adhesive failure at interface with PEN | good | clean adhesive failure at interface with PEN |
| Composition 11 isodecyl acrylate | good | clean adhesive failure at interface with PEN | good | clean adhesive failure at interface with PEN |
| Composition 12 isodecyl methacrylate | good | clean adhesive failure at interface with PEN | good | clean adhesive failure at interface with PEN |
| Composition 13 lauryl acrylate | good | clean adhesive failure at interface with PEN | good | clean adhesive failure at interface with PEN |
| Composition 14 tetradecyl acrylate | good | clean adhesive failure at interface with PEN | good | clean adhesive failure at interface with PEN |
| Composition 15 hexadecyl acrylate | good | clean adhesive failure at interface with PEN | good | adhesive failure at interface with either PEN or glass, residual on both |
| Composition 16 octadecyl acrylate SR257 | good | clean adhesive failure at interface with PEN | good | adhesive failure at interface with either PEN or glass, residual on both |
| Composition 17 isobornyl acrylate | good | clean adhesive failure at interface with PEN | good | clean adhesive failure at interface with glass, residual on PEN |

Example 5

Thermal Stability

A formulation according to Composition 11, Table 3, was prepared with the exception that the mono-acylphosphine photoinitiator was Darocur TPO (Ciba). A 1.25 mm sample was cured under 1J UVA and analyzed at 200° C. for three hours using a RSA III Dynamic Analyzer (TA Instruments). As shown in FIG. 1, the cured sample showed only a minor drop (8.27E+6 Pa to 7.37E+6 Pa) in storage modulus under prolonged heating.

Example 6

Incompatibility of Alternative Reactive Diluents

In addition to the formulations recorded in Table 3, other mono- or di-functional polar acrylic monomers as diluents were tested, but were found to be not compatible with the hydrogenated polybutadiene diacrylate. When reactive diluent tetrahydrofuryl acrylate (SR 285, Sartomer), tetraethylene glycol diacrylate (SR 268, Sartomer), alkoxylated hexane diol diacrylate (CD 561, Sartomer), polyethyleneglycol diacrylate (SR-610, Sartomer), tricyclodecane dimethanol diacrylate (SR 833S, Saratomer), 1,6-hexanediol diacrylate (SR 238B, Saratomer) were used, all compositions were hazy and incompatible. Although these polar diluents may be used at low level in the formulations, they are less desirable as compared to the low polarity monoacrylates.

Example 7

Impact of Adhesion Promoter

PEN substrates with different surface treatment may have different release performance using the temporary adhesives described in Examples 1-5. In this example a proprietary PEN substrate (different from Teonex Q65 used above) was used. Using Composition 11, Example 4 as a control, poor release characteristic was observed as evidenced by adhesive residue left on PEN substrate. Based on Composition 11, a laminating adhesive composition was prepared to contain 72 parts by weight of an hydrogenated polybutadiene diacrylate (CN 308, Sartomer), 18 parts isodecyl acrylate (SR395, Sartomer) as a diluent, 0.9 parts by weight of a mono-acylphosphine photoinitiator (Irgacure, 2100) and 0.09 parts by weight of methacryloxypropyltrimethoxysilane as an adhesion promoter.

The formulation was spin coated on 5.08 cm×7.62 cm (2 in×3 in) glass slides. The glass slides and PEN flexible substrate were laminated at 100° C. and 137895 N/m2 (20 psi). Samples were exposed to 1J UVA through the PEN. The PEN film was then peeled off the wafer and the adhesive failure noted. The adhesive failed cleanly from PEN in both cases, that is, it remained on the rigid wafer and left no adhesive residue on PEN.

What is claimed:

1. A radiation curable laminating adhesive composition for use in high temperature applications comprising:
   (A) an hydrogenated polybutadiene acrylate with no urethane linkage having a number average molecular weight of about 500 to about 10,000;
   (B) a radical photoinitiator capable of initiating polymerization at wavelengths of 300 nm and above, selected from the group consisting of alpha-aminoketones and mono-acylphosphine oxides;
   (C) a diluent selected from the group consisting of a monofunctional low polarity acrylate having 6-14 carbons in a linear or branched alkyl chain, and a non-polar linear or branched alkane with a boiling point ranging from 95° to 200° C.

2. The composition of claim 1 further comprising an adhesion promoter.

3. A flexible substrate adhered to a rigid substrate with an adhesive comprising:
   (A) an hydrogenated polybutadiene acrylate with no urethane linkage having a number average molecular weight of about 500 to about 10,000;
   (B) a radical photoinitiator capable of initiating polymerization at wavelengths of 300 nm and above, selected from the group consisting of alpha-aminoketones and mono-acylphosphine oxides;
   (C) a diluent selected from the group consisting of a monofunctional low polarity acrylate having 6-14 carbons in a linear or branched alkyl chain, and a non-polar linear or branched alkane with a boiling point ranging from 95° to 200° C.

4. The composition of claim 3 further comprising an adhesion promoter.

5. A plastic thin-film transistor backplane manufactured at temperatures greater than 150° C. using a laminating adhesive comprising:
   (A) an hydrogenated polybutadiene acrylate with no urethane linkage having a number average molecular weight of about 500 to about 10,000;
   (B) a radical photoinitiator capable of initiating polymerization at wavelengths of 300 nm and above, selected from the group consisting of alpha-aminoketones and mono-acylphosphine oxides;
   (C) a diluent selected from the group consisting of a monofunctional low polarity acrylate having 6-14 carbons in a linear or branched alkyl chain, and a non-polar linear or branched alkane with a boiling point ranging from 95° to 200° C.

6. The composition of claim 5 further comprising an adhesion promoter.

7. A method for temporarily adhering a plastic substrate to a rigid substrate comprising:
   laminating the plastic substrate and a rigid substrate with an adhesive composition, the adhesive comprising
      (A) an hydrogenated polybutadiene acrylate with no urethane linkage having a number average molecular weight of about 500 to about 10,000;
      (B) a radical photoinitiator capable of initiating polymerization at wavelengths of 300 nm and above, selected from the group consisting of alpha-aminoketones and mono-acylphosphine oxides;
      (C) a diluent selected from the group consisting of a monofunctional low polarity acrylate having 6-14 carbons in a linear or branched alkyl chain, and a non-polar linear or branched alkane with a boiling point ranging from 95° to 200° C.

8. The method of claim 7 wherein the adhesive composition further comprises an adhesion promoter.

9. The method of claim 7 further comprising
   photocuring and aging said adhesive composition laminated to the plastic and rigid substrate; and
   peeling said plastic substrate off of the rigid substrate.

10. The method of claim 9 wherein aging said adhesive composition occurs at temperatures equal to or greater than 150° C.

11. The method of claim 9 wherein aging said adhesive composition occurs at temperatures equal to or greater than 200° C.

12. A radiation curable laminating adhesive composition for use in high temperature applications consisting essentially of:
- (A) an hydrogenated polybutadiene acrylate with no urethane linkage having a number average molecular weight of about 500 to about 10,000;
- (B) a radical photoinitiator capable of initiating polymerization at wavelengths of 300 nm and above, selected from the group consisting of alpha-aminoketones and mono-acylphosphine oxides;
- (C) a diluent selected from the group consisting of a monofunctional low polarity acrylate having 6-14 carbons in a linear or branched alkyl chain, and a non-polar linear or branched alkane with a boiling point ranging from 95° to 200° C.

* * * * *